Patented May 31, 1927.

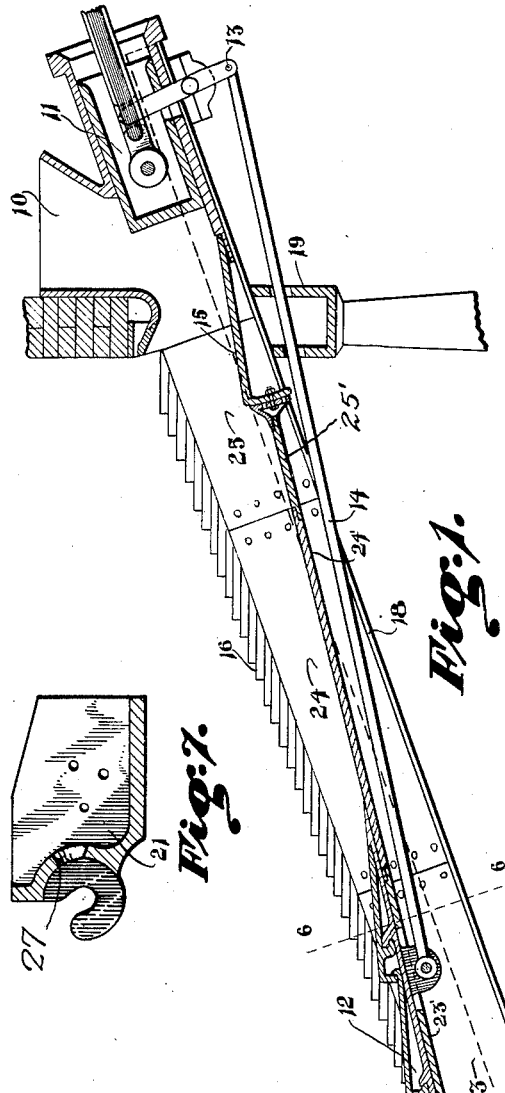
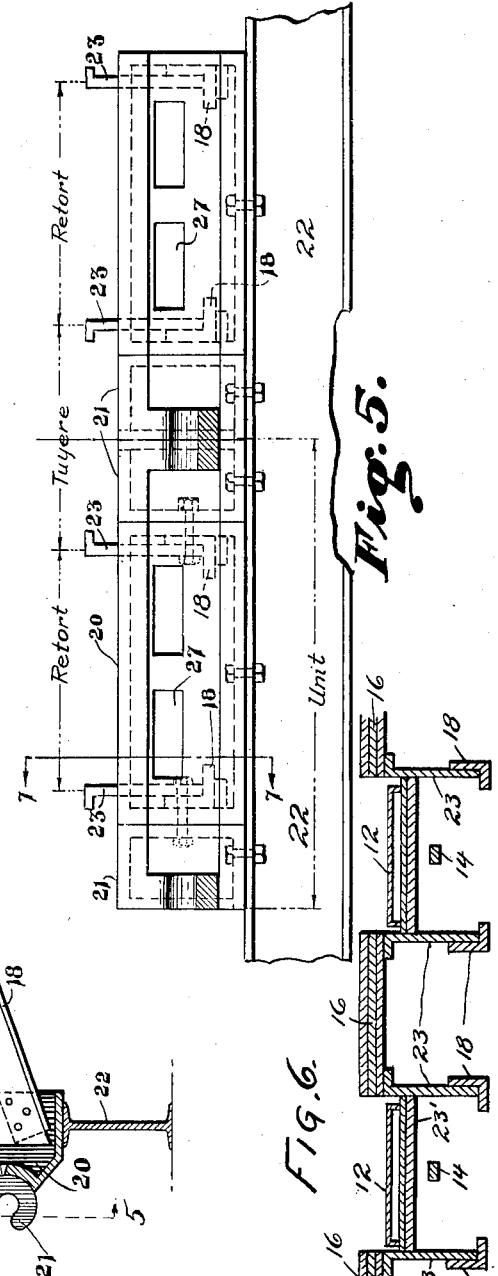

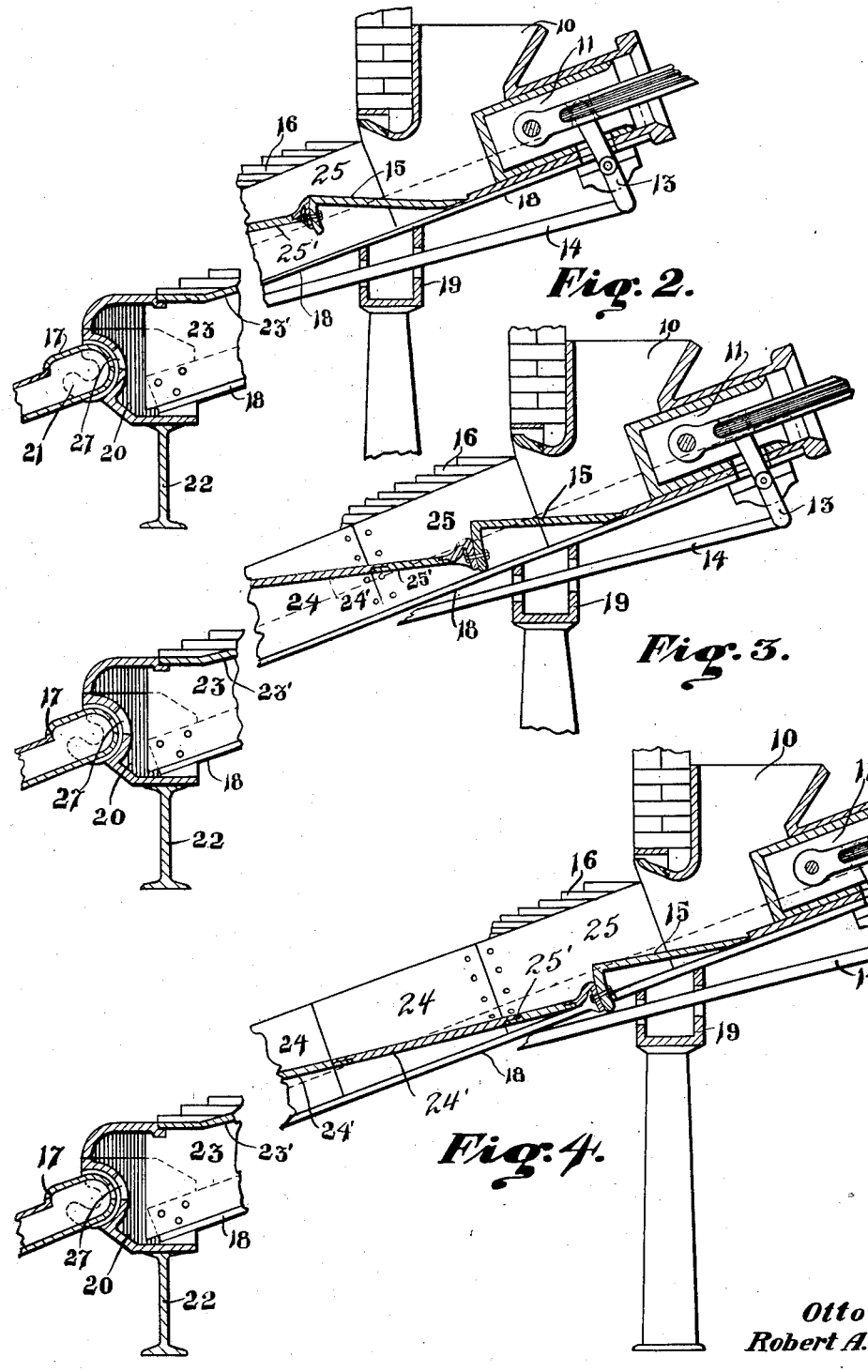

1,630,738

UNITED STATES PATENT OFFICE.

ROBERT A. FORESMAN AND OTTO ARAM, OF ESSINGTON, PENNSYLVANIA, ASSIGNORS TO WESTINGHOUSE ELECTRIC AND MANUFACTURING COMPANY, A CORPORATION OF PENNSYLVANIA.

RETORT UNIT FOR STOKERS.

Application filed April 12, 1921. Serial No. 460,796.

This invention relates to stokers for boiler furnaces and more particularly to underfeed stokers in which longitudinally sloping fuel retorts are formed between wind box tuyère sections, arranged in spaced relation, and it has for an object to provide a method and means for constructing stokers of the character designated, varying sizes of which shall be capable of ready assembly from a few standard component parts. It has for a further object the provision of a method and means for building the retort units in different sizes and assembling said units to afford stoker installations within the limits of construction. The invention will be more clearly understood from the following description in which the drawings show the construction and combinations of elements in an apparatus embodying our invention.

Fig. 1 is a sectional view in elevation of a portion of an underfeed stoker embodying the improved structure.

Figs. 2, 3 and 4 are broken sectional views of the apparatus illustrated in Fig. 1 showing the application of extension parts to build up the respective sizes of stokers for certain installations;

Fig. 5 is a view partially in elevation and partially in section taken on the line 5—5 of Fig. 1 showing the supporting elements of the discharge portion of a furnace;

Fig. 6 is a view in section taken on the line 6—6 of Fig. 1; and

Fig. 7 is a view on the line 7—7 of Fig. 5.

The fuel-bed supporting structure in underfeed stokers of the design heretofore mentioned is made up of longitudinal sloping wind boxes arranged in spaced relation and plate members arranged to close the spaces between the wind boxes. The wind boxes are substantially rectangular box-like castings with inward projections on the top to hold interchangeable tuyère blocks which are adapted to supply air to the fuel bed in requisite quantities. The sides of each wind box casting have outside projecting ribs extending along the side thereof to form the contour of the bottom of a retort. The side elements and the bottom elements supported by the ribs form a retort between the wind boxes to receive incoming fuel. The wind box castings form the principal supporting members for any accessory stoker structure, such as auxiliary rams and the dump grate mechanism located at the discharge portion of the stoker.

In order to stand up under excessive heat and the heavy loads to which it is subjected, the wind box casting must necessarily be of a heavy and rugged construction. In accordance with prior practice, a casting of the above character must be designed for each size of stoker, that is, a wind box designed for a 17-tuyère stoker would have to be designed to carry a load imposed thereon by that particular requirement of stoker installation, and a 17-tuyère wind box casting could not be made over to include a lesser or greater number of tuyères. It may be also noted that the wind box casting is a fundamental part or nucleus upon which each stoker installation is based. In assembling an underfeed stoker of well known type the wind box castings are first placed in spaced relation and then the bottom plates for the fuel retorts are assembled thereto, thus making the retort a secondary structural feature.

While the above is the general design of stokers of this type, the marketing of a stoker installation is on a different basis. Stoker installations are in general purchased on a retort basis, that is, a customer requires a given number of retorts to meet his needs, and it is the purpose of our present invention to build a unit retort and to supply the same to the market as a unit embodying standard component parts. We are enabled to accomplish this result by building up a stoker of interchangeable units constructed of a relatively small number of standardized component parts in such a manner that large and expensive castings are eliminated. For example, in Fig. 2 we illustrate a 14-tuyère stoker, that is, a stoker having a length from front to rear sufficient to accommodate 14 tuyère plates in each tuyère bank or inclined series of tuyère plates, which is the smallest size for certain purposes. The unit referred to consists of a ram box 10, a bottom deflector plate 15, tuyère blocks 16, dump grate castings 20 and 21, retort side members 23 and 25 with corresponding bottom plate members 23' and 25' and angle supporting members 18 which support the elements comprising the unit and which may be termed for brevity in this specification, standard component parts. The supporting members 18 may be cut from stock material in lengths as required for certain installations. The component parts of this type of stoker may readily be incorporated in a 17-tuyère stoker, that is, one having 17 tuyère plates in each inclined series or bank of tuyère plates, as illustrated in Fig. 3, which may be termed an intermediate size stoker. This extension is accomplished by the insertion of relatively small side plate members indicated at 24 and a corresponding bottom plate member 24'. In a like manner Fig. 4 illustrates a large size or 20-tuyère stoker, built of the same component parts as the type illustrated in Fig. 2 with the addition of two intermediate side plate members 24 between side plates 23 and 25 with corresponding bottom plate members 24' between bottom plates 23' and 25' and longer supporting members 18. As heretofore pointed out, a 20-tuyère stoker embodies the same fundamental component parts as the small size or 14-tuyère stoker, with the addition of the small intermediate extension plates 24 which involve a small expense. It will readily be seen that stoker installations from the smallest to the largest may be effected at a small additional expense and with no redesigning of any of the component parts.

Referring to the drawing for a more detailed description of our invention, Fig. 1 shows an assembly view in section through the retort of a stoker embodying our invention. Fuel from a ram box 10 is fed into the stoker by a reciprocating ram 11 operated by any suitable power mechanism (not shown). Fuel is further agitated and worked rearwardly within the furnace by an auxiliary ram 12 operating within the retort and which receives a relative motion from the ram 11 by suitably arranged operating lever 13 and link 14. The incoming fuel is pushed over a suitably arranged deflector plate 15 which causes the fuel to spread over adjacent tuyère sections 16 in order that it receive the proper amount of air and be consumed on its downward travel over said sections to a suitably arranged discharge mechanism, (Fig. 2). Extending throughout the stoker construction are angle supporting members 18 which rest on suitable front spacing supports 19 and fasten at the rear to a supporting and spacing casting 20, the latter being secured to a suitable support 22. A support 21 for the dump grate 17 is also secured to the casting 20 and supported by the I-support member 22.

The fuel retort unit built between the angle supporting members 18, as shown in Figs. 2 and 5, embodies side plate members 23, 25. The detail view shown in Fig. 5 illustrates the mode of securing the retort units at the lower and discharge portion of the retort.

The retort side plates 23 are secured at their lower portion in any suitable manner to the angle supporting members 18 and to the supporting and spacing element 20. The supporting and spacing element 20 is a specially designed member constructed to accommodate the dump grate and admit air thereto through openings 27 arranged to coöperate with corresponding openings in the dump grate (Fig. 2). The casting 21 has integrally formed therewith a hook member designed to carry the dump grate mechanism as shown in Figs. 5 and 7. The castings 21 are symmetrical and one secured at each end to the casting 20 and to the common support 22. The arrangement is such that the angles 18, side members 23, castings 20 and 21 may be secured together in a simple and durable manner to form a rigid base portion for the stoker unit.

Having thus described an apparatus designed in accordance with our invention, the assembly thereof is carried out in the following manner. Assume that a stoker is required for a small installation, as for example, the stoker illustrated in Fig. 2. The construction involves the assembling of standard retort side plates 23 and 25 with suitable bottom plates 23' and 25' upon the supporting angle members 18. The members 18 are the supporting members upon which the retort unit is based and are held and supported at the front of the furnace by supporting casting 19. At the rear of the retort the angle members 18 and side members 23 are firmly held by special castings 20 and 21. The space between the retort units is covered by the special interlocking tuyère plate castings 16. The ram box 10 and the castings 20 and 21, together with retort side members 23 and 25, with corresponding bottom members, are standard retort elements for all stoker installations. If a large size stoker is required, as for example that shown in Figure 1, side plates 24 are inserted between the plates 23 and 25 and a bottom plate 24' is inserted between the plates 23' and 25' and angle irons 18 are supplied at a sufficient length from standard material to carry the additional structure.

From the foregoing description, the utility of our invention will be readily apparent from the standpoint of the manufacturer and consumer alike. The outstanding advantages to be obtained from building stokers in accordance with our invention may briefly be summarized as follows:

1. Those arising from a standardization of stoker constructions including an increase in production capacity, thereby increasing production, and a decrease in the unit cost of the stoker installation.

2. The combination of heavy and expensive castings for each size stoker and the incorporation of standard interchangeable parts for stokers of varying sizes.

3. The making of the retort a neucleus upon which the manufacture, assembly and sales of stoker installations are based.

4. The ease of replacement of parts worn out or burned out and the relatively small quantity of stock parts necessary to be carried to make replacements in any installation.

While we have shown our invention in but one form, it will be obvious to those skilled in the art that it is not so limited but is susceptible of various other changes and modifications, without departing from the spirit thereof and we desire, therefore, that only such limitations shall be placed thereupon as are imposed by the prior art or as are specifically set forth in the appended claims.

What we claim is:

1. A retort unit for stokers of the character designated comprising two longitudinal retort supporting elements extending the length of the unit, a ram box secured to and adapted to space apart the supporting elements at the front of the stoker, spacing members supporting the supporting elements at the rear of the stoker, intermediate retort side wall and bottom elements between the ram box and rear spacing member, said side wall and bottom elements being made in sections, said ram box and rear spacing member securing the elements together as a unit, said unit adapted to be changed in length by the insertion or removal of side wall and bottom element sections in the intermediate portion of the retort and, by the substitution of longer or shorter supporting elements.

2. A unit for stoker installation comprising a fuel ram box, side wall and bottom elements arranged to form a retort, supporting members extending the length of the retort, an element at the discharge end of the retort for holding the supporting members thereof in spaced relation, symmetrical members one secured at each end of said last mentioned elements for spacing adjacent retorts, and a discharge mechanism carried by the symmetrical members at the rear of the retort.

3. In an underfeed stoker of the character designated, a unit comprising a ram box at the forward portion thereof, an inclined retort composed of sections of side wall and bottom elements, a discharge mechanism at the lower end of the retort, two supporting members extending the length of the retort and the ram box, an element arranged substantially between and adapted to secure and support the retort supporting members at the discharge portion of the retort, symmetrical spacing elements secured, one at each end of the said supporting element and adapted to carry the last discharge mechanism.

4. A unit construction for stokers comprising a fuel feeding mechanism, an inclined fuel retort, a member supporting the lower end of the retort, the length of the member being approximately equal to the width of the retort, symmetrical elements secured one adjacent each end of said member, the combined length of the supporting member and adjacent symmetrical elements being equal to the width of the unit.

5. In combination in a unit construction for an underfeed stoker in which a plurality of retorts are placed in side by side spaced relation to form wind chambers therebetween, a retort unit comprising a fuel ram box, side wall and bottom elements arranged to form substantially a trough, supporting members extending the length of the ram box and trough, a supporting element extending substantially between the side wall elements at the discharge portion of the trough and securing the supporting members in spaced relation, symmetrical elements secured one at each end of the supporting element and each symmetrical element being substantially equal in length to one-half the distance between the side walls of adjacent retorts when assembled.

6. In an underfeed stoker furnace, a unit comprising a ram box, a retort and a discharge mechanism at one end of the retort, supporting members extending the length of the retort and ram box, means at the discharge end of the retort to secure and support the supporting members in spaced relation, an element secured to each end of said securing and supporting means to cooperatively engage the discharge mechanism and adjacent units placed in side by side relation for lateral extension of the stoker.

7. In an underfeed stoker having alternate retorts and wind chambers, a unit comprising a fuel ram box, sectional side wall and bottom retort elements, the retort walls constituting bounding walls of the wind box chambers adjacent the retort, longitudinally extending members supporting the retort and ram box, a discharge mechanism at the lower end of the retort, a supporting element for the supporting members and for the discharge mechanism, said mechanism extending the width of the retort and half the width of the adjacent wind boxes, thus being co-extensive with the width of the unit, the unit being capable of extension longitudinally by the insertion of side wall and bottom elements and the substitution of laterally extending supporting members of suitable length and the stoker being capable of extension laterally by the addition of units in side by side relation.

8. In a unit construction for stokers comprising a fuel feed mechanism including ram box, a retort, supporting member extending the length of the retort and ram box, a discharge mechanism at one end of the retort, a member at the discharge end of the retort for supporting and spacing the retort supporting members, said member having air admitting openings therein to register with a corresponding opening in the discharge mechanism and elements secured one at each end of the spacing member to support the discharge mechanism.

9. In combination, in a unit for stoker furnaces, a ram box, a retort, angle supporting members extending the length of the retort and ram box, a discharge mechanism at the end of the retort, an element arranged between the retort supporting members for spacing and supporting the same at the discharge ends thereof, air passages within the spacing element for supplying air to the discharge mechanism, symmetrical members carried one at each end of the spacing element and means carried by the symmetrical members for carrying the discharge mechanism and spacing adjacent units.

In testimony whereof, we have hereunto subscribed our names this 11th day of April, 1921.

R. A. FORESMAN.
OTTO ARAM.